July 8, 1958     K. H. FOSKETT     2,842,384
BOX WITH INTERCONNECTED NON-ROTATING HUB
Filed May 23, 1955

Inventor
Kenneth H. Foskett
by Roberts, Cushman & Grover
Att'ys

United States Patent Office 2,842,384
Patented July 8, 1958

2,842,384

BOX WITH INTERCONNECTED NON-ROTATING HUB

Kenneth H. Foskett, Manchester, N. H., assignor to Anchor Manufacturing Company, Boston, Mass., a corporation of Massachusetts Application May 23, 1955, Serial No. 510,079

4 Claims. (Cl. 285—203)

In many cases it is desirable to attach a hub over an opening in a box so that a conduit may be attached to the box in alignment with the opening. A typical example is a switch box or meter box where wires lead to or from the box through the conduit.

Objects of the present invention are to provide a construction which is simple and economical, which is neat and attractive in appearance, which prevents the hub from rotating when a conduit is threaded into or out of the hub, which presents a smooth surface around the opening in the box so as not to chafe the insulation on the wires extending through the hub, and which is durable and reliable in use.

According to the present invention the apparatus comprises a hub having an internal flange seating on the outside of the box around the opening, the edge of the box around the opening and the flange having interfitting lugs and recesses. Disposed in the opening is a ring having at its outer end an external flange overlapping said internal flange and at its inner end an external flange overlapping said edge of the box, thereby to anchor the hub to the box so that the hub cannot rotate relatively to the box and to present a smooth surface around the opening. The external flanges on the ring are preferably wide enough completely to cover the aforesaid lugs and recesses. In the preferred construction the lugs are on the hub flange and the recesses are in the edge of the box around the opening. Preferably the lugs are died from the outside of the hub flange lengthwise of the hub with corresponding recesses on the inside of the flange and the length of the lugs approximate the thickness of the box so as to bear on the box throughout the entire thickness of its wall. In the preferred embodiment the recesses in the periphery of the opening are semi-circular and the lugs are shaped to fit the recesses.

For the purpose of illustration a typical embodiment of the invention is shown in the accompanying drawings in which—

The particular embodiment of the invention chosen for the purpose of illustration comprises a meter-socket box having a front 1 provided with an opening 2 through which a meter may be plugged into socket jaws inside the box in the usual way. The top 3 of the box has a flange 4 telescoping over the front 1. Usually the top 3 is fast to the box and the front 1 is removable by swinging the lower end forwardly and then slipping the upper end downwardly from behind the flange 4.

Figure 1:
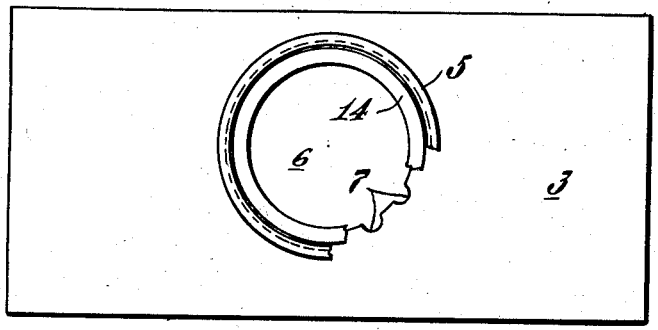
Fig. 1 is an end view of a meter-socket box with a hub attached to its upper end according to the present invention, parts being broken away.
Figure 2:
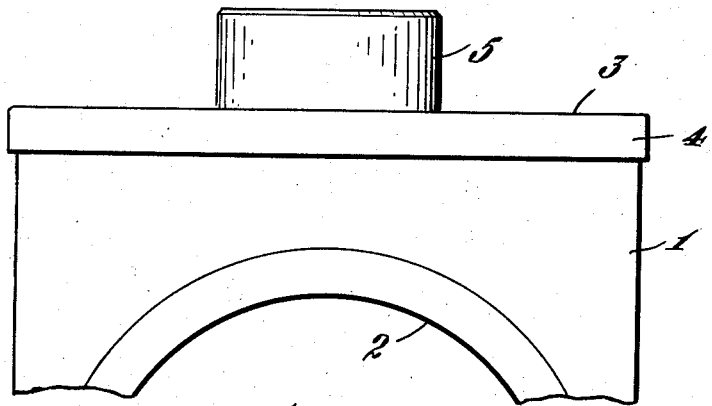
Fig. 2 is a front view of the box.
Figures 3, 4, 5:
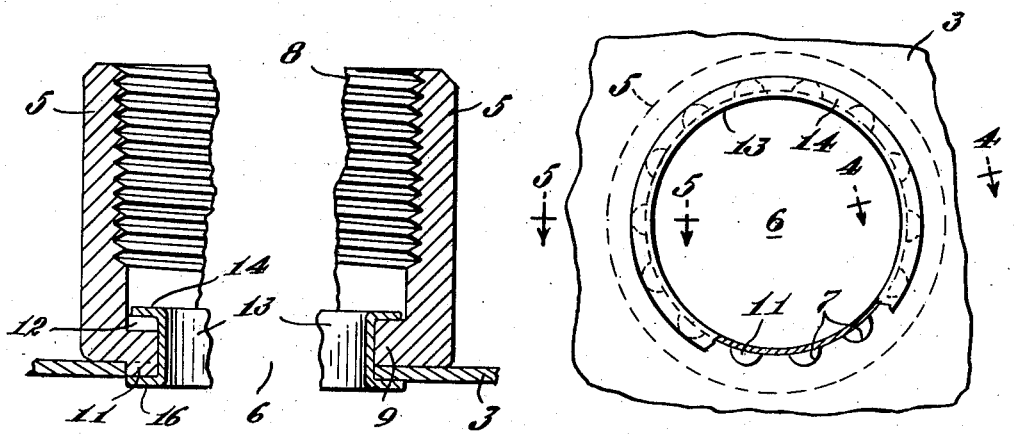
Fig. 3 is an inside view of the box looking upwardly, with a part of the ring and box broken away.
Fig. 4 is a section on line 4—4 of Fig. 3.
Fig. 5 is a section on line 5—5 of Fig. 3.

According to the present invention a hub 5 is mounted over an opening 6 in the top 3. The edge of the box around the opening 6 is provided with a series of semi-circular recesses 7 which are distributed uniformly around the opening. The hub 5 is preferably provided with threads 8 for connection with a conduit and in addition it has on its inner end an internal flange 9, the internal diameter of which is substantially the same as that of the opening 6 in the box. At intervals around the flange corresponding to the spacing of the recesses 7, the flange is died downwardly to form lugs 11 which fit the recesses 7, leaving corresponding recesses 12 above the lugs. As shown in Fig. 5 the length of the lugs 11 is substantially equal to the thickness of the box wall 3 so that they fill the recesses 7.

The hub is anchored in position on the box by means of a ring 13 having on its outer end a flange 14 overlapping the inside of the hub flange 9 and at its inner end an external flange 16 overlapping the inside of the box around the opening. The radial dimensions of the flanges 14 and 16 are preferably equal to the corresponding dimensions of the recesses 7 and lugs 11 so that the flanges cover the lugs and recesses. The ring 13 is preferably applied to the box by first forming the inside flange 16, then inserting the ring from the inside of the box and then forming over the flange 14.

From the foregoing it will be evident that the parts are firmly interconnected so that the hub cannot rotate relatively to the box and so that there is no danger of chafing the wires extending through the hub because of the smooth surface presented by the ring 13. Inasmuch as the lugs and recesses are completely covered by the ring the appearance is neat and attractive. By distributing the recesses 7 and lugs 11 uniformly around the periphery of the opening, the hub fits the box in any one of a number of positions corresponding to the number of pairs of recesses and lugs.

It should be understood that the present disclosure is for the purpose of illustration only and that this invention includes all modifications and equivalents which fall within the scope of the appended claims.

I claim:

1. The combination of a box having an opening in one wall, a screw-threaded hub having at one end a narrow internal flange, the outer face of the flange seating on the outside of the box around the opening, the inside diameter of the flange approximating the diameter of the opening so that the inner edges of the flange and opening register approximately, the edge of the box around said opening having radial notches in its periphery and said flange having lugs projecting lengthwise of the hub into said notches from the inner edge of said face, and in said opening a ring having at its inner end an external flange overlapping the edge of said internal flange and at its outer end a second external flange overlapping said edge of the box, thereby to anchor the hub to the box so that the hub cannot rotate relatively to the box and to present around said opening a smooth surface whose internal diameter is only slightly smaller than that of the hub.

2. The combination of claim 1 further characterized in that the length of said lugs approximates the thickness of the box wall.

3. The combination of claim 1 further characterized in that the abutting surfaces of said lugs and notches are approximately normal to said face.

4. The combination of claim 1 further characterized in that the lugs are died from said internal flange with corresponding recesses on the inner face of the flange and said external flanges cover said lugs and notches respectively.

References Cited in the file of this patent

UNITED STATES PATENTS

| 562,067 | Copeland | June 16, 1896 |
| 782,353 | McClellon | Feb. 14, 1905 |
| 1,655,104 | Oakley | Jan. 3, 1928 |
| 1,689,510 | Wackman | Oct. 30, 1928 |
| 2,026,757 | Swanstrom | Jan. 7, 1936 |
| 2,475,007 | Carlson | July 5, 1949 |

FOREIGN PATENTS

| 13,913 | Great Britain | June 23, 1898 |
| 12,199 | Great Britain | May 24, 1909 |